May 8, 1962 F. W. BRIXNER 3,034,099

CODE COMMUNICATION SYSTEM

Filed Dec. 15, 1958 3 Sheets-Sheet 1

INVENTOR

F. W. BRIXNER

BY

HIS AGENT

May 8, 1962 F. W. BRIXNER 3,034,099

CODE COMMUNICATION SYSTEM

Filed Dec. 15, 1958 3 Sheets-Sheet 2

INVENTOR
F. W. BRIXNER

BY

HIS AGENT

INVENTOR
F.W. BRIXNER
BY
[signature]
HIS AGENT

United States Patent Office 3,034,099
Patented May 8, 1962

3,034,099
CODE COMMUNICATION SYSTEM

Frederick W. Brixner, Rochester, N.Y., assignor to General Railway Signal Company, Rochester, N.Y.
Filed Dec. 15, 1958, Ser. No. 780,616
5 Claims. (Cl. 340—163)

Figure 1A:
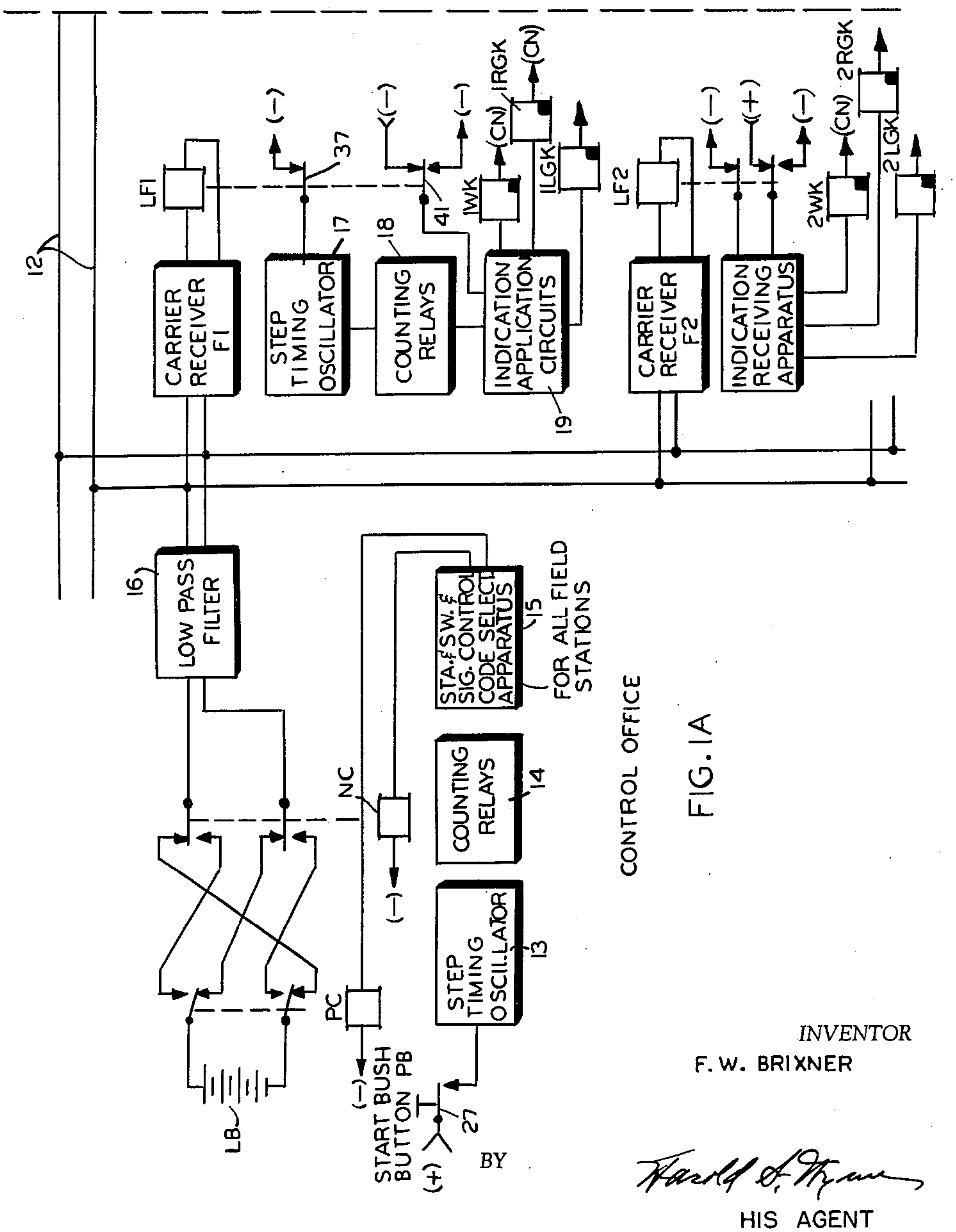

This invention relates to communication systems, and it more particularly pertains to the communication part of a centralized traffic control system for railroads.

In a centralized traffic control system for railroads, railway traffic over an extensive stretch of trackway is controlled from a central control office, there being several remotely spaced field stations along the trackway at which switch and signal devices are located, and other signaling equipment, for governing railway traffic. The intelligent designation by an operator at a control office of controls for the different devices is dependent upon the operator being informed by indications registered on a control panel as to the conditions of the devices at the several field stations.

According to the present invention, a shunt type line circuit is provided connecting the control office with the several field stations. Control codes are transmitted from the control office for governing the devices at the field stations as direct current code pulses during control cycles of operation. Step timing oscillators are used at the control office and at all of the field stations in conjunction with counting relays for determining the duration of the code elements and the number of steps constituting each cycle of operation.

When a device is operated at a field station in accordance with a control code transmitted from the control office, the change in its condition initiates the transmission immediately of an indication cycle from that field station to register the new condition of the device at the control office. This is possible, irrespective of the number of field stations, without interfering with the transmission of indications from other field stations, because of communication being maintained with each field station on a distinctive carrier frequency. Upon initiation of an indication cycle at any field station, an associated step timing oscillator and counting relays are initiated, and at the same time, an indication stepper at the control office provided for the particular field station transmitting is also initiated. By this organization, the control office can receive from several field stations at the same time, without the communication from one field station interfering with another, and also at the same time, the control office can transmit designated controls for any one of the field stations.

An object of the present invention is to provide for the communication of switch and signal controls and indications in a centralized traffic control system in such a manner as to permit controls and indications to be transmitted at the same time and as to permit several field stations to transmit their indications at the same time.

Another object of the present invention is to permit immediate indication of the devices at the control office from the several field stations without interfering with the transmission of designated controls for the several field stations.

Other objects, purposes and characteristic features of the present invention will be in part obvious from the accompanying drawings and in part pointed out as the description of the invention progresses.

Figure 1B:
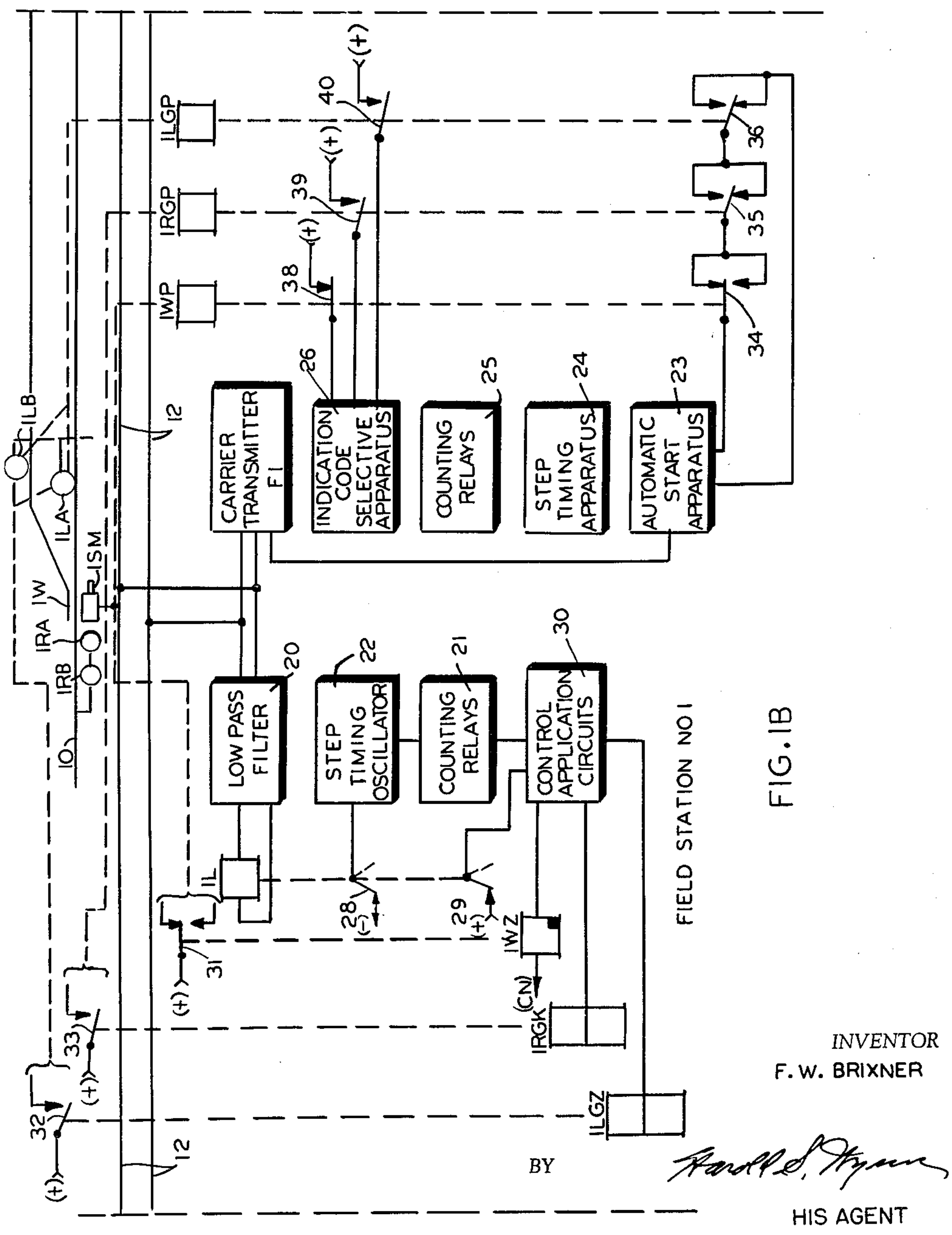
Figure 1C:
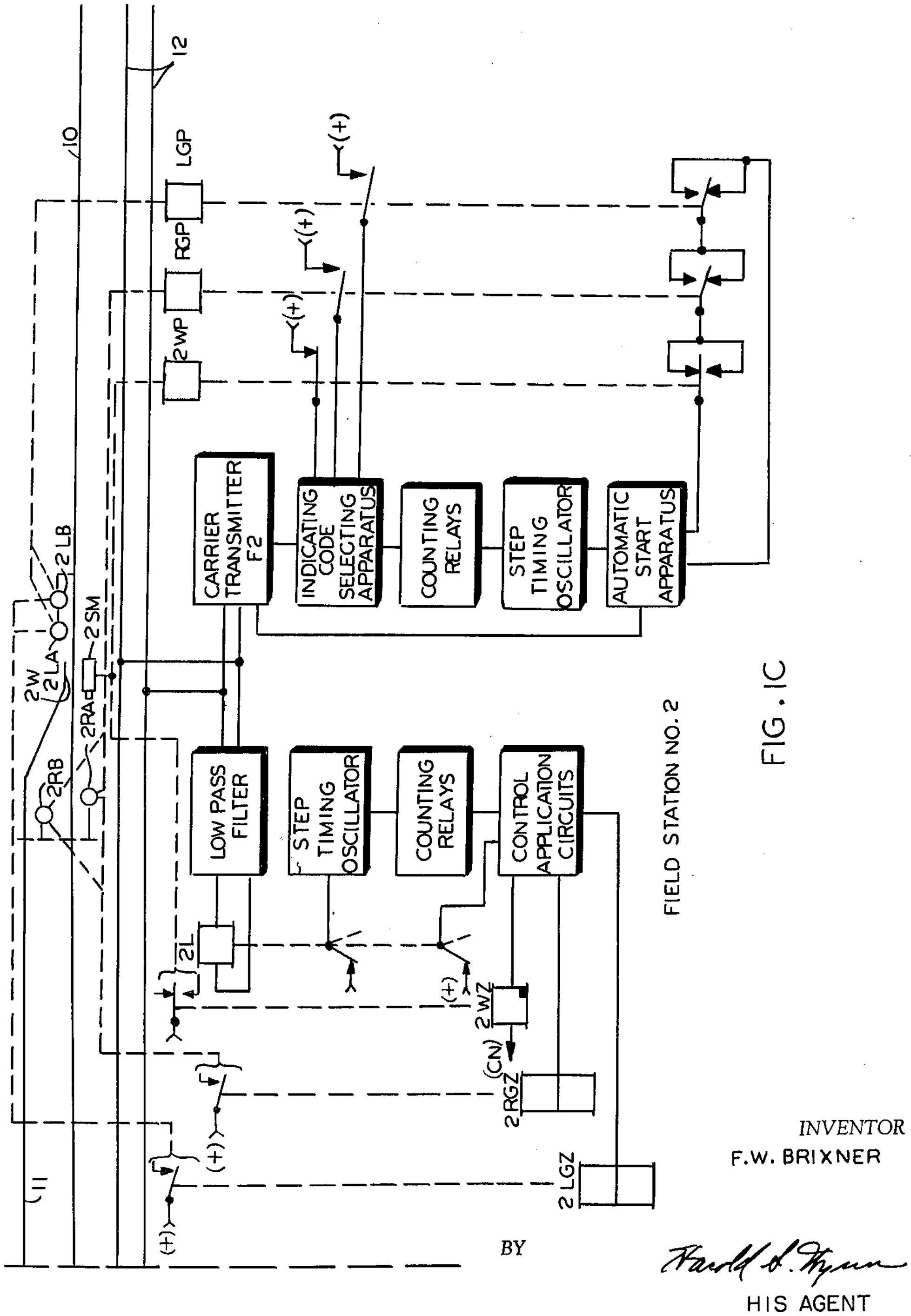

In describing the invention in detail, reference is made to the accompanying drawings in which similar letter reference characters have been used to designate parts having similar features or functions and in which:

FIGS. 1A, 1B and 1C when placed end to end respectively illustrate a centralized traffic control system employing one embodiment of the code communication apparatus according to the present invention.

The illustrations employed have been arranged to facilitate the disclosure of the invention as to its mode of operation and the principles involved rather than for the purpose of illustrating the specific construction and arrangement of parts that would be employed in practice. Thus certain components of the apparatus are illustrated in block form, and relays and their contacts are shown in a conventional manner, and the symbols (+) and (—) have been used to identify respective positive and negative terminal of suitable batteries or other sources of direct current and the symbol (CN) has been used to indicate connection to the center tap of a suitable battery or other source of direct current.

For the purpose of simplifying this disclosure of the present invention, the present invention is shown as being applied to a relatively simple track layout that may be considered as being a typical part of an extensive track layout, or that may be considered as just illustrating typical organizations that may be applied by a person skilled in the art to the control of track switches and signals in different and more complex arrangements of track switches and signals in more extensive track layouts.

The track layout for one embodiment of the present invention is illustrated in FIGS. 1B and 1C as comprising a stretch of single track 10 having associated therewith passing siding 11 connected to track 10 by track switches 1W and 2W at the respective left-hand and right-hand ends thereof. Eastbound signals 1RA and 1RB are provided for governing eastbound traffic through the track switch 1W, and the signals 1LA and 1LB are provided for governing westbound traffic through this track switch. Similarly, the signals 2RA and 2RB are provided for governing eastbound traffic through the track switch 2W, and the signals 2LA and 2LB are provided for governing westbound traffic through this track switch. The signals at the left-hand end of the passing siding 11 are at field station No. 1, and the signals at the right-hand end of passing siding 11 are at field station No. 2.

A pair of line wires 12 connect the control office with the field stations in a manner to maintain a continuous connection whereby the wires may also be used for telephone communication or for other purposes in accordance with the requirements of practice.

Control transmitting apparatus is provided at the control office as is illustrated in FIG. 1A including positive and negative code transmitting relays PC and NC respectively, a line battery LB, a Step Timing Oscillator 13, Counting Relays 14 and Station and Switch and Signal Control Code Selecting Apparatus 15. A suitable Low Pass Filter 16 is employed to connect the direct current code transmitting apparatus to the line wires 12.

Indication code receiving apparatus is provided at the control office for conditioning switch and signal registration relays in accordance with indication codes received over the line wires 12. The indication registration relays are preferably of the magnetic stick type, and there is a bank of these relays, such as the relays 1WK, 1LK and 1RK, provided at the control office for each of the field stations.

The control of each bank of indication registration relays is by carrier receiving apparatus tuned to a frequency characteristic of the field station for which the registration relays are provided. Thus, for the control of the registration relays 1WK, 1RGK and 1LGK for field station No. 1, for example, a Carrier Receiver F1 is provided at the control office which is tuned to the carrier frequency transmitted by field station No. 1, and a line relay LF1 is subject to energization by the output of the carrier receiver whereby this line relay is selectively responsive to code pulses transmitted only from field station No. 1. The receiving apparatus for receiving from field station No. 1 also includes a Step Timing Oscillator 17, Counting Relays 18 and Indication Application Circuits 19. It is to be understood that a similar bank of code receiving apparatus is provided at the control office for each of the other field stations.

The code communication apparatus illustrated in FIG. 1B as being provided for field station No. 1 is typical of the apparatus provided for each of the field stations. The apparatus for receiving direct current control pulses transmitted over the line wires 12 from a control office comprises a suitable line relay 1L connected to the line wires 12 through a Low Pass Filter 20. The control cycle steps are counted at field station No. 1 by counting relays 21, and the step periods are timed by Step Timing Oscillator 22.

A magnetic stick relay 1WZ is provided for controlling the operation of the power switch 1W, and signal control relays 1LGZ and 1RGZ are provided for controlling the signals at field station No. 1 for governing eastbound and westbound traffic respectively.

Code transmitting apparatus is provided at field station No. 1 for transmitting selected indication codes to the control office over the line wires 12 at a carrier frequency F1. Thus the transmitter at field station No. 1 includes a Carrier Transmitter F1 which transmits at a frequency characteristic of field station No. 1 only.

The indication transmitting apparatus at field station No. 1 includes Automatic Start Apparatus 23 which is operable to initiate an indication cycle in response to a change in the condition of one of the devices at field station No. 1. A Step Timing Oscillator 24 is provided for timing the steps during the transmission of an indication cycle, and a bank of Counting Relays 25 is provided for counting the steps of each indication cycle. Indication Code Selecting Apparatus 26 is provided at field station No. 1 for selecting the code characters to be transmitted during the respective steps of an indication cycle in accordance with the condition of the devices to have their positions indicated at the control office.

Having thus described the general organization of the apparatus for one embodiment of the present invention, more specific consideration of this apparatus will now be given with respect to the mode of operation under certain typical operating conditions.

To consider first the mode of operation for the communication of controls, it will be assumed that an operator desires to transmit controls to field station No. 1 for setting up a route through the track switch 1W at the left-hand end of the passing siding 11. To initiate transmission to this field station he actuates the start push button PB (see FIG. 1A) and closes contact 27 which is effective to initiate a control cycle. Similar push buttons (not shown) are provided for initiating transmission to the other field stations. In accordance with the actuation of the start push button PB, the Step Timing Oscillator 13 is initiated, and the initiation of the cycle at the control office is effective to pole change the line circuit and thus cause the relay NC to be dropped away and the relay PC to become picked up to actuate the line relay 1L at field station No. 1 and the line relays L at the other field stations to initiate the Step Timing Oscillator at each of the field stations at substantially the same time.

In accordance with the oscillators being initiated at all stations including the control office, the counting relays at all stations and at the control office become active to count the steps of the control cycle. The line relays PC and NC are selectively energized during the several steps of the control cycle to apply selectively (+) and (−) pulses through their contacts to the line wires 12 in accordance with code selecting apparatus 15 which selects first a station selection code, and then a code indicative of the switch and signal controls that have been designated by positioning switch and signal control levers (not shown). After all of the steps have been taken, the counting relays are restored to their normal positions, and the step timing oscillators are energized to render them inactive and to condition them for initiation of the next control cycle.

At field station No. 1, the actuation of the line relay 1L in response to the pole changing of the line circuit at the control office is effective by the opening of front contact 28 to deenergize the Step Timing Oscillator 22 to initiate a control cycle at that field station. Contact 29 of relay 1L applies energy of one polarity or another to Control Application Circuits so that station selection is accomplished dependent upon the reception of a code during the first part of the cycle assigned to field station No. 1. Following the station selection portion of the cycle, the relay 1WZ is actuated in accordance with the position of contact 29 during a particular step of the cycle, and the track switch 1W is operated to its normal or reverse position in accordance with the picked up or dropped away condition of the relay 1WZ, the circuit for the switch machine 1SM for operating the track switch 1W being illustrated as selected in accordance with the position of contact 31 of relay 1WZ. Similarly, subsequent steps during the control cycle provide for the selective energization of the relays 1LGZ and 1RGZ in accordance with the code received. If relay 1LGZ is picked up during the cycle, the closure of its front contact 32 causes the clearing of the signal 1LA or signal 1LB dependent upon the position of the track switch 1W. If the relay 1RGZ is picked up, the closure of its front contact 33 is effective to permit the clearing of signal 1RA or signal 1RB for governing eastbound traffic through the track switch 1W, one or the other of these signals being selected in accordance with whether the track switch 1W is in its normal or reverse position.

Having thus described how a control cycle of operation is effective for establishment of one route at one field station, it should be readily apparent that a similar mode of operation is effective for the establishment of other routes, and for the establishment of routes at any other field station that may be designated by the operator at the control office.

To consider the communication of indications from the field stations to the control office, it will be assumed that a cycle of operation for the transmission of indications is initiated at field station No. 1 by a change in the condition of one of the devices to have its position indicated at the control office. Thus, upon operation of the track switch 1W from one position to another, for example, the switch repeater relay 1WP is actuated, and the actuation of this relay causes actuation of its contact 34 in a suitable start circuit. This is effective to deenergize a normally energized start relay (not shown) which is maintained energized by a stick circuit including contacts 34, 35 and 36 of relays 1WP, 1RGP and 1LGP respectively.

As is indicated by the block diagram in FIG. 1B, the automatic start apparatus starts the Step Timing Oscillator 24 and also is effective to cause the transmission of a distinctive carrier signal by carrier transmitter F1 over the line wires 12 to the control office to initiate the Step Timing Oscillator 17 at the control office (see FIG. 1A). Such initiation at the control office is rendered effective by the opening of front contact 37 of the line relay LF1 in the circuit which is normally effective for maintaining the Step Timing Oscillator 17 inactive.

After the indication cycle has been initiated, it is unnecessary to transmit an indication station code because separate receiving apparatus is provided at the control office for receiving indications from each of the field stations, the different field stations being identified at the control office by reason of the carrier frequency that is received. As the indication cycle progresses, distinctive characters are selected for transmission successively in accordance with the condition of the relays 1WP, 1RGP and 1LPG as is indicated by whether or not the contacts 38, 39 or 40 of these relays respectively are open or closed.

If the relay 1WP is in its picked up position during an indication cycle, for example, a code character is transmitted via carrier frequency F1 over line wires 12 to the control office which selectively energizes the line relay LF1 so as to cause the relay 1WK to be operated to a corresponding position in accordance with the position of contact 41 of relay LF1. The relay 1WK, therefore, is a registration relay which registers an indication of the condition of the track switch 1W at field station No. 1. Similarly the relays 1LGK and 1RGK at the control office register indications as to the condition of the associated signals 1L and 1R respectively at field station No. 1.

Having thus described the mode of operation of the system for the communication of indications from field station No. 1 to the control office, it is to be understood that a similar mode of operation is effective for the communication of indications from the other field stations to the control office, separate receiving apparatus being provided at the control office for the several field stations.

It will therefore be readily apparent that all stations can transmit their indications at the same time, and that indications may be received simultaneously at the control office without interference, and it will also be readily apparent that controls may be transmitted from the control office to the different field stations independent of whether or not indications are being transmitted over the line wires 12 in as much as the direct current code pulses used for the transmission of controls will not interfere with the transmission of indications at their carrier frequencies and vice versa.

Having thus described a code communication system as applied to the centralized traffic control of a particular track layout as one embodiment of the present invention, it is to be understood that this form of the invention is disclosed more particularly to facilitate the disclosure of the mode of operation and the principles involved in the invention, and it is to be understood that various adaptations, alterations and modifications may be applied to the specific form shown to meet the requirements of practice.

What I claim is:

1. In a code communication system for the control from a control office of devices at several remotely spaced field stations and for the indication at the control office of conditions of said devices, indication transmitting means including a carrier transmitter operable at a distinctive frequency, a step counting relay chain and a step timing oscillator at each of the field stations for transmitting selected multiple element indication codes to the control office of the conditions of said devices, indication registering means at the control office for the several field stations, and indication code receiving means at the control office including carrier receivers, step counting relay chains and normally energized step timing oscillators for the several field stations for conditioning said indication registration means in accordance with the condition of the devices at the several field stations as communicated by multiple element indication codes transmitted on the several carrier frequencies.

2. A code communication system for the communication from a control office to a plurality of remote field stations of designated controls for devices at the field stations and for the communication of indications from the field stations to the control office of the conditions of the devices comprising in combination, code communication apparatus including a step counting relay chain and a normally energized step timing oscillator at the control office and at each of the field stations for communicating selected multiple element control codes from the control office to the field stations for the selective control of said devices, indication transmitting apparatus including carrier transmitters operating at different frequencies at the several field stations and including a stepper and a step timing oscillator at each station for transmitting selected multiple element indication codes to the control office indicative of the conditions of said devices, indication registering means at the control office for the several devices at the field stations, and indication code receiving means at the control office including carrier receivers, step counting relay chains and normally energized step timing oscillators for the several field stations for conditioning said indication registering means at the control office in accordance with the multiple element indication codes received indicative of the conditions of the devices at the several field stations.

3. A code communication system according to claim 2 wherein said code communication apparatus includes an unbroken line circuit to which direct current code pulses are applied at the control office through a low pass filter.

4. A code communication system according to claim 3 wherein the carrier transmitters have their outputs applied to said line circuit.

5. A code communication system according to claim 4 wherein the carrier transmitters at the several field stations have their outputs applied to said line circuit in multiple.

References Cited in the file of this patent

UNITED STATES PATENTS

| | | |
|---|---|---|
| 1,869,847 | Grondahl | Apr. 2, 1932 |
| 1,907,922 | Bossart | May 9, 1933 |
| 2,400,260 | Miller | May 14, 1946 |
| 2,581,056 | Walmsley et al. | Jan. 1, 1952 |
| 2,627,063 | Richards | Jan. 27, 1953 |
| 2,793,357 | Wynn | May 21, 1957 |
| 2,794,179 | Sibley | May 28, 1957 |
| 2,883,647 | Leeds et al. | Apr. 21, 1959 |